United States Patent [19]

Gottschalk

[11] 4,082,436
[45] Apr. 4, 1978

[54] MOTION PICTURE CAMERA

[76] Inventor: Robert E. Gottschalk, 10660 Chalon Rd., Los Angeles, Calif. 90024

[21] Appl. No.: 710,164

[22] Filed: Jul. 30, 1976

Related U.S. Application Data

[60] Division of Ser. No. 582,698, Jun. 2, 1975, which is a continuation of Ser. No. 388,630, Aug. 15, 1973, abandoned.

[51] Int. Cl.² ............................................. G03B 23/02
[52] U.S. Cl. ...................................... 352/72; 352/133; 352/242; 352/243
[58] Field of Search ...................... 352/35, 93, 72, 133, 352/242, 243; 354/118, 119, 110, 111, 210

[56] References Cited

U.S. PATENT DOCUMENTS

| 2,169,422 | 8/1939 | Kelley | 354/111 |
| 2,196,358 | 4/1940 | Heinisch | 352/35 |
| 2,204,049 | 6/1940 | Planskoy | 354/119 |
| 3,826,567 | 7/1974 | Vockenhuber | 352/133 |

FOREIGN PATENT DOCUMENTS

| 1,150,504 | 4/1969 | United Kingdom | 352/35 |

Primary Examiner—Monroe H. Hayes
Attorney, Agent, or Firm—Lyon & Lyon

[57] ABSTRACT

A motion picture camera has a plurality of openings where a film cartridge may be selectively mounted, the film passing through the selected opening into engagement with the film drive apparatus of the camera and back to the cartridge. The various openings provide for better balance with various support arrangements for the camera, such as on the shoulder or on a tripod.

3 Claims, 13 Drawing Figures

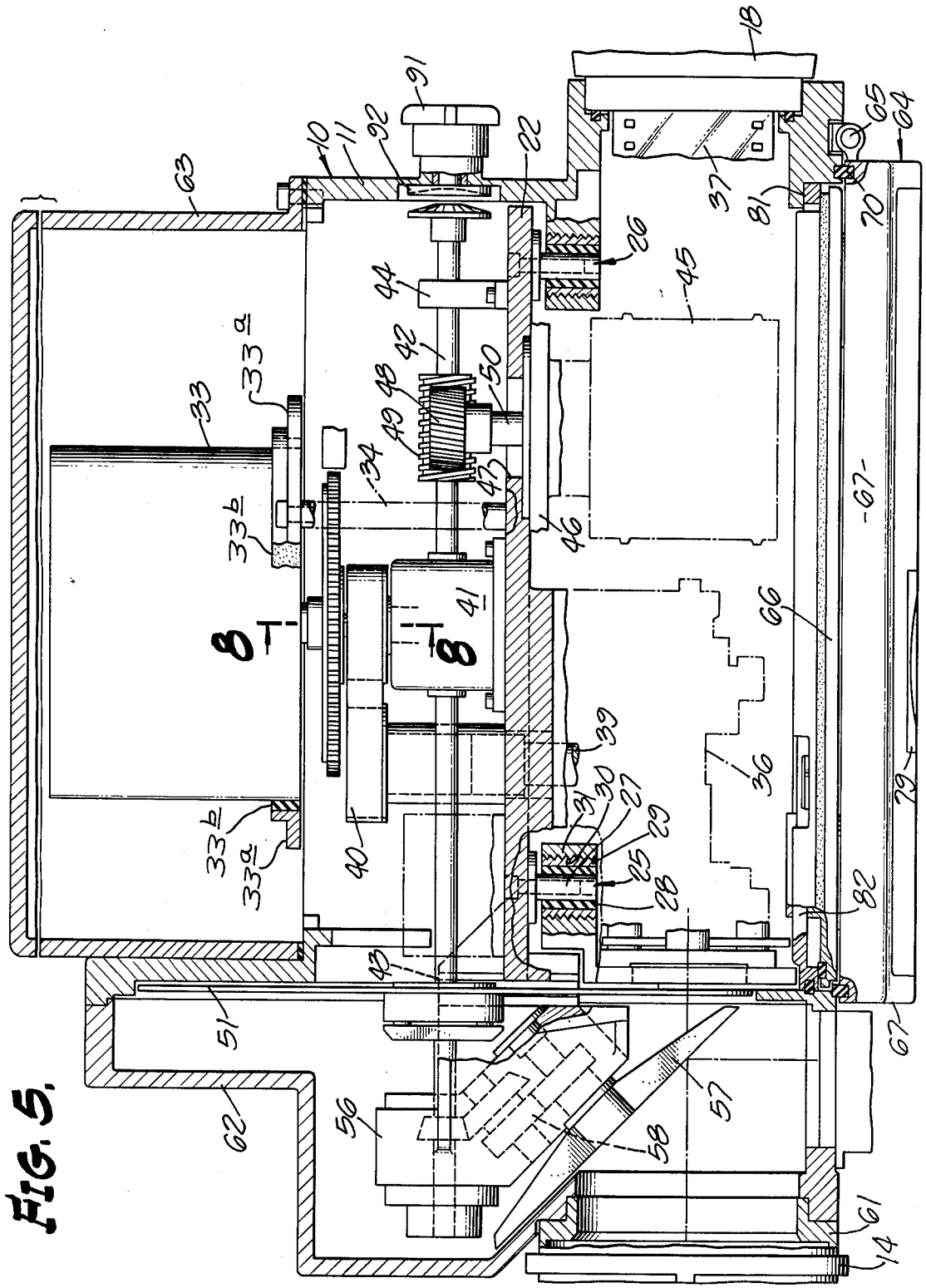

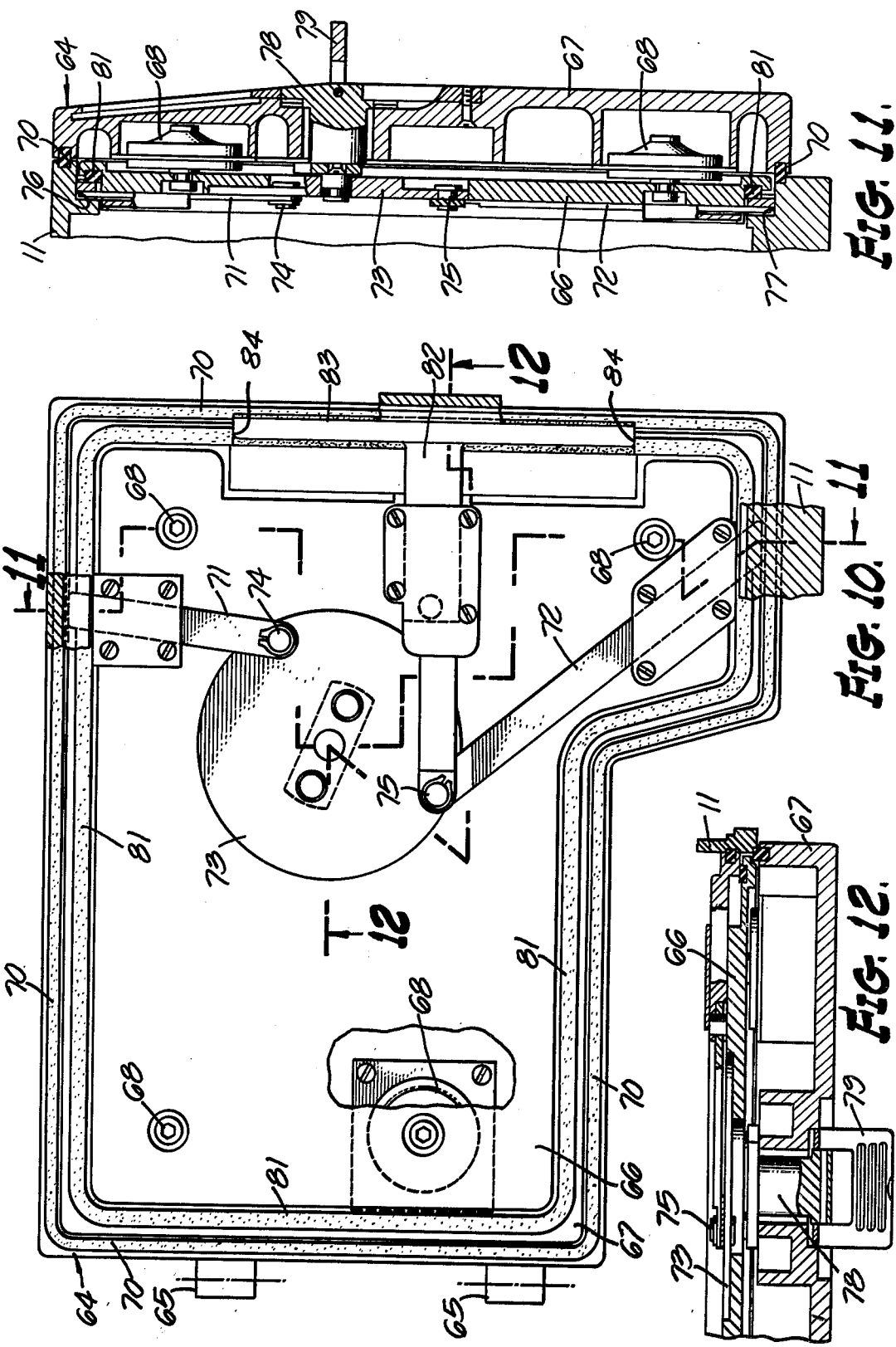

MOTION PICTURE CAMERA

This is a division, of application Ser. No. 582,698, filed 6/2/75 which was a continuation of application Ser. No. 388,630 filed Aug. 15, 1973 now abandoned.

This invention relates to motion picture cameras of the professional type used for producing motion picture photoplays provided with a sound track. It is essential that the cameras used for such work produce as little sound as possible in order to avoid recording on the sound track unwanted sounds produced by the motion picture camera. It has been customary to provide a "blimp" to enclose the motion picture camera and thus minimize unwanted sounds produced by the camera. However, the blimp is awkward and cumbersome and cannot readily be used unless the camera is mounted on a tripod.

It is the principal object of this invention to provide a portable lightweight motion picture camera which can be hand-held or balanced on the shoulder, and which produces so little sound that a blimp is not required. Another object is to produce such a motion picture camera in which the sound level produced is on the order of 27 decibels, when operating with the film in place.

It has been found that sound generated by the moving parts of a conventional motion picture camera is often "broadcast" by the lens assembly which is attached to the camera frame through a metal-to-metal connection. Even though much of the sound generated by the camera "movement", film feed device, film strip itself, driving motor, etc. can be muffled within the camera housing, a significant proportion of the sound is broadcast through the lens assembly.

In accordance with this invention, the propagation of sound through the lens assembly is substantially eliminated by mounting the lens assembly on the camera housing, and then mounting all of the moving parts of the camera within the housing on a single support member or plate, which plate is secured to the camera housing only through sound-absorbing connectors.

Other and more detailed objects and advantages will appear hereinafter.

In the drawings:

FIG. 5 is a sectional plan view taken substantially on the lines 5—5 as shown in FIG. 4.

FIG. 10 is a side elevation showing the inside of the insulated door for the camera housing.

FIG. 11 is a sectional elevation taken substantially on the lines 11—11 as shown in FIG. 10.

FIG. 12 is a sectional plan view partly broken away taken substantially on the lines 12—12 as shown in FIG. 10.

Figure 1:
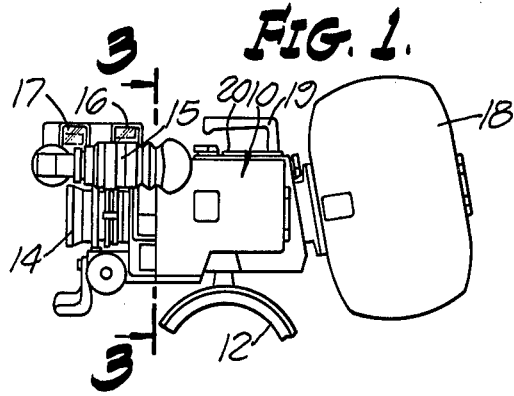
FIG. 1 is a side elevation showing a preferred form of the invention, the camera and its related parts and accessories being positioned on a shoulder mount.
Figure 2:
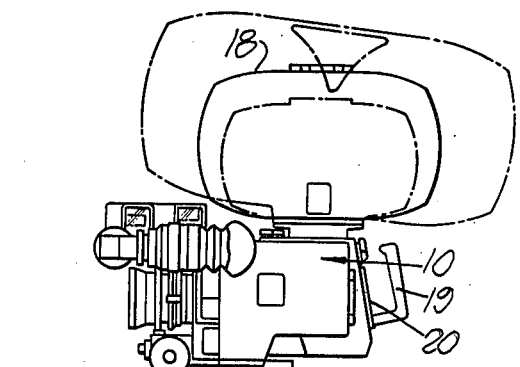
FIG. 2 is a similar view showing the camera and its related parts and accessories being positioned on a tripod mount.
Figure 6:
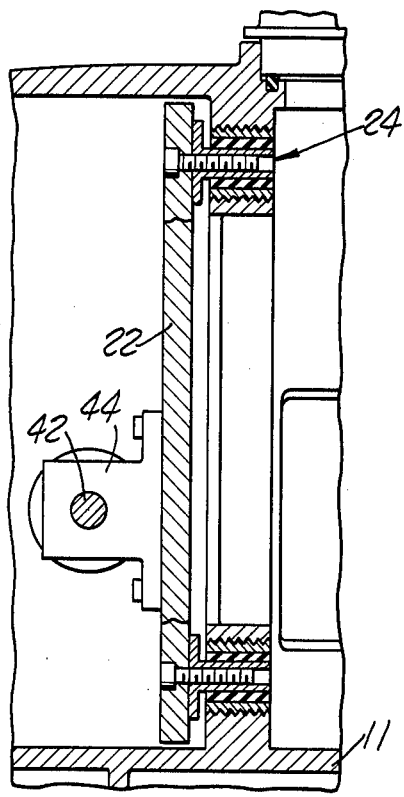
FIG. 6 is a sectional elevation taken substantially on the lines 6—6 as shown in FIG. 4.

Referring to the drawings, the motion picture camera generally designated 10 includes a housing 11 which may be supported on a shoulder mount 12 as shown in FIG. 1, or on a tripod mount 13 as shown in FIG. 2. An interchangeable lens assembly 14 is mounted at the forward end of the camera 10, together with a view finder assembly 15, a film speed indicator 16, and a film footage meter 17. A film magazine 18 may be mounted at the back face of the housing 11 as shown in FIG. 1, or, alternatively, may be mounted on the top face of the housing 11 as shown in FIG. 2. Various sizes of film magazines may be employed as shown by the phantom lines in FIG. 2. A handle 19 mounted on a cover plate 20 is used to close an opening in the camera housing, whichever opening is not being used for the film magazine 18.

Figure 4:
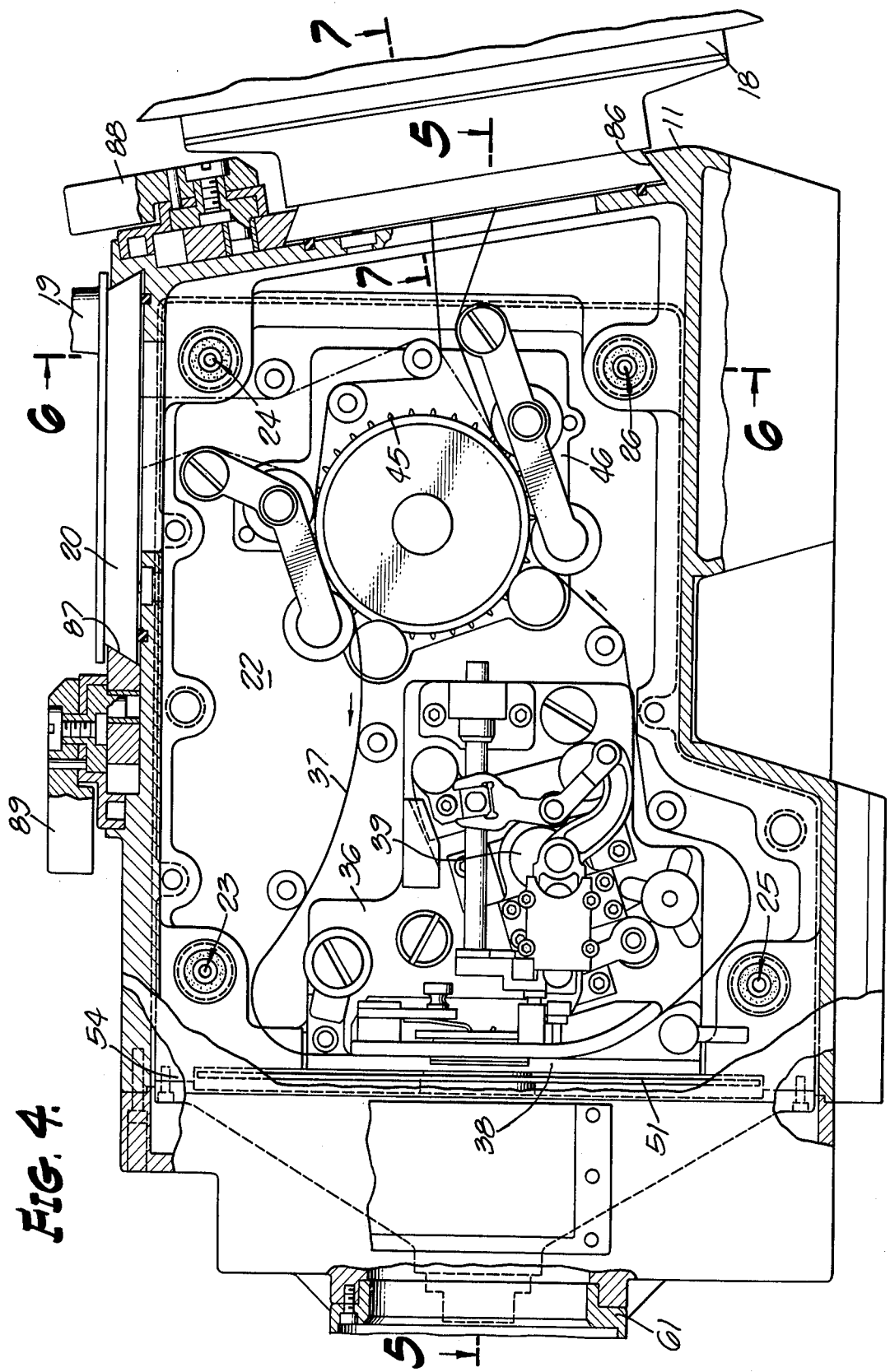
FIG. 4 is a side elevation partly broken away, taken substantially on the lines 4—4 as shown in FIG. 3.

A mounting plate 22 is positioned within the housing 11 but is connected to the housing 11 only by means of four sound-insulating connectors 23, 24, 25 and 26, as shown in FIGS. 4 and 5. These connectors are duplicates and each includes a metal pin 27 fixed to the metal mounting plate 22 and received within an elastomeric liner 28 carried in a bushing 29. The bushing 29 is threaded externally for reception of the internal threads 30 within a boss 31 formed integrally with the camera housing 11. The mounting plate 22 is thus supported within the camera housing 11 but the supporting means are sound-insulated so that transmission of sound between the mounting plate 22 and the camera housing 11 is effectively inhibited.

All of the components of the camera which produce sound during the operation of the camera are fixed to the mounting plate 22, and not to the housing 11. Thus the electric motor 33 is carried on spaced metal posts 34 fixed to the mounting plate 22. The flange 33a carried by the posts 34 grips the outside of the electric motor 33 only through the elastomeric sound-insulating ring 33b. The camera "movement" assembly 36 which advances the film 37 intermittently through the aperture plate 38 is also fixed to the mounting plate 22. The drive shaft 39 which is driven by the motor 33 through belt 40 is carried on the mounting plate 22 and serves to drive the camera movement assembly 36. The gear box 41 which is driven by the electric motor 33 is mounted directly on the mounting plate 22 and contains gears, not shown, which turn the drive shaft 42. The axially spaced bearings 43 and 44 for the drive shaft 42 are carried on the mounting plate 22. The film drive sprocket 45 is rotatably mounted on a support 46 fixed to the mounting plate 22 and is driven by shaft 50 which extends through opening 47 and is connected to the driven gear 48 in mesh with the driving gear 49 on the shaft 42.

Figure 3:
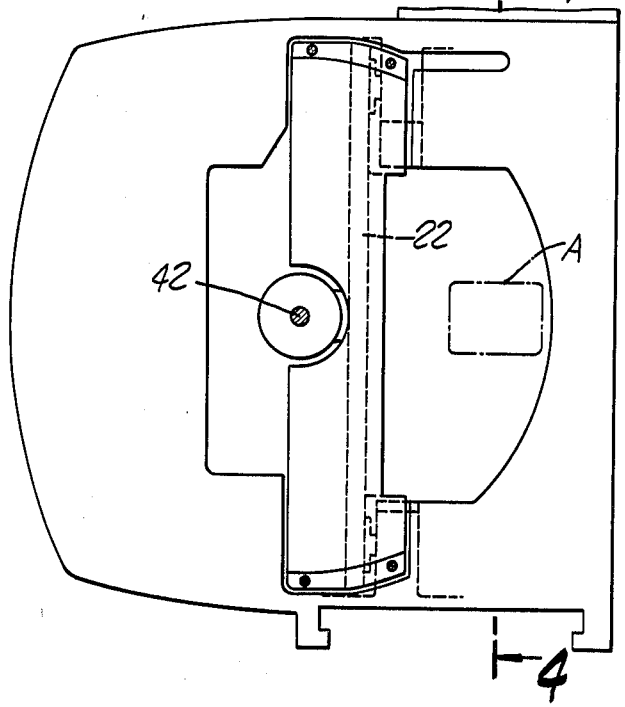
FIG. 3 is a sectional elevation taken substantially on the lines 3—3 as shown in FIG. 1.
Figure 9:
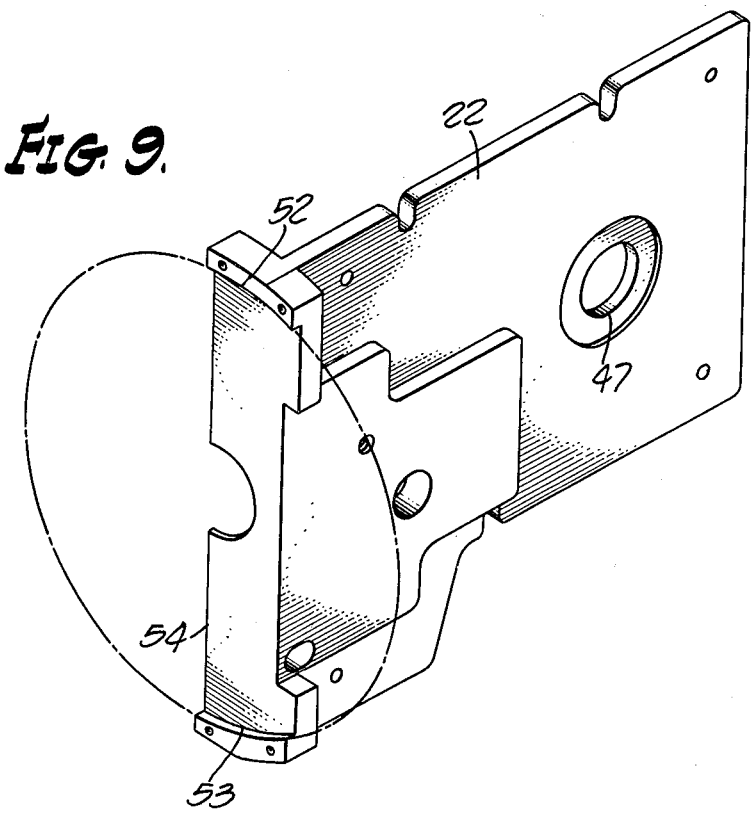
FIG. 9 is a perspective view of the support plate.

The rotary shutter 51 is fixed to the shaft 42 and turns with clearance within the arcuate walls formed on the cross flange 54 at the forward end of the mounting plate 22 (see FIG. 9). The path of the rotary shutter 51 is indicated by the phantom lines in FIG. 9. The position of the film aperture "A" is indicated by the phantom lines in FIG. 3.

A second gear box 56 which drives the rotary mirror 57 from the forward end of the shaft 42 is positioned forwardly of the rotary shutter 51 and is supported by the top and bottom portions of the cross flange 54 on the mounting plate 22. This second gear box 56 does not touch the camera housing and is not connected to it. A gear train 58 mounted within the gear box 56 serves to rotate the mirror 57 when the shaft 42 turns.

From the foregoing description it will be understood that all of the noise-generating components of the camera are fixed on the mounting plate 22, and none of them touch the camera housing 11. Moreover, the camera housing 11 completely surrounds all of the noise-generating components. As pointed out above, the only connection between the mounting plate 22 and the housing 11 is provided by the sound-insulating connectors 23, 24, 25 and 26. The lens mounting ring 61 for the interchangeable lens assembly 14 is fixed to the camera housing, or more particularly, to the cover section 62 comprising a part of the camera housing 11.

Figure 13:
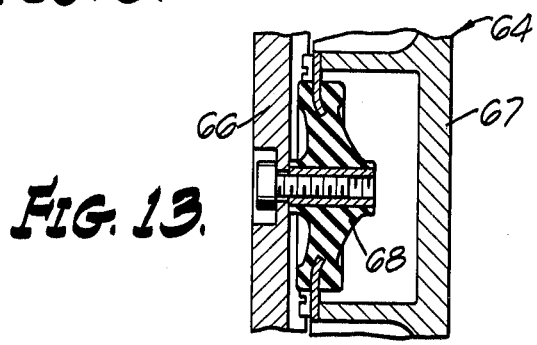
FIG. 13 is an enlarged sectional view of a portion of FIG. 11.

Another portion of the camera housing 11 is provided by the detachable housing part 63. An insulated double door 64 mounted on hinges 65 also forms a part of the camera housing 11. The door may be swung open to gain access to the film strip 37, or to the camera movement aperture plate 38, or for any other purpose. The door 64 is an assembly of an inner door 66 and an outer door 67. The inner door is separated from the outer door (no metal-to-metal contact) through the use of vibration isolater assemblies 68 connecting the doors. The details of construction of these vibration isolaters are shown in FIG. 13.

Closing of the double door 64 causes the seal strip 70 on the outer door 67 to contact the camera housing and means are provided for tightening the seal strip 70 under pressure. This means includes sliding latches 71 and 72 operated by rotary actuator 73 and pivotal connections 74 and 75. The projecting ends of the latches 71 and 72 move into recess 76 and 77, respectively, provided in the camera housing. The rotary actuator 73 is turned by means of stub shaft 78 and pivoted handle 79 accessible exteriorly of the outer door 67. When the latches 71 and 72 are in locking position as shown in FIGS. 10 and 11, pressure is applied to seal the inner door 66 on its seal strip 81. The isolation mounts 68 flex sufficiently to pull the outer door 67 toward the camera housing to compress the seal strip 70. A locking arm 82 is also pivoted to the rotary actuator 73 at 75 and is slidably guided for movement into and out of a recess formed in the camera housing 11. The transverse head portion 83 on the locking arm 82 fills the recess 84 to complete the sealing of the inner door 66. The recess 84 in the camera housing is required to facilitate removal of the camera movement aperture plate 38 for cleaning and inspection purposes.

The opening 86 in the back face of the camera housing 11 is a duplicate in size and shape of the opening 87 in the upper face of the camera housing 11. A manually operated cam locking mechanism 88 locks the film magazine 18 in place in the opening 86 while a similar mechanism 89 locks the cover plate 20 with its handle 19 in the other opening 87. As pointed out above, the film magazine 18 may be installed in the opening 87 while the cover plate 20 may be installed in the opening 86, if desired. The threading of the film strip 37 from the film magazine 18 through one of the openings in the camera housing and to and from the camera movement and feed sprocket 45 is conventional. The phantom lines in FIG. 4 show how the film strip is positioned when a film magazine 18 is positioned in the opening 87 in the camera housing.

A spring loaded threading knob 91 is mounted for both axial and rotary movement on the back face of the camera housing 11, as shown in FIG. 5. Manual force may be applied to the knob 91 to bring the flange 92 into engagement with the flange 93 on the end of the shaft 42. The knob 91 may therefore be used to turn the shaft 42 and rotary shutter 51 to any desired position, when the electric motor 33 is not energized.

Figure 7:
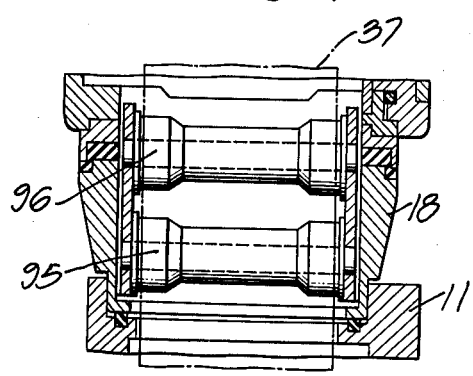
FIG. 7 is a sectional detail taken substantially on the lines 7—7 as shown in FIG. 4.

FIG. 7 shows how a portion of the film magazine 18 is received within one of the openings 86 and 87 in the housing 11. Guide rollers 95 and 96 guide the film strip 37 in a conventional fashion.

Figure 8:
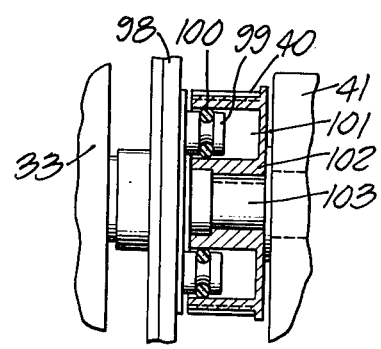
FIG. 8 is a sectional detail taken substantially on the lines 8—8 as shown in FIG. 5

The fragmentary view of FIG. 8 shows details of the coupling connection by which the electric motor 33 drives the input shaft to the gear box 41. Thus a flanged hub 98 driven by the motor 33 carries a plurality of axially extending drive pins 99 each encircled by an "O" ring 100. The pins 99 extend into pockets 101 provided in the drive pulley 102 for the belt 40. This drive pulley 102 is fixed to the shaft 103 which drives the gear box 41.

The sounds generated within the camera housing by the camera movement assembly 36, driving motor 33, gear box 41, gears 49 and 48, and the gear train 58 within the mirror driving gear box 56, as well as the sounds generated by the film strip itself—all of these sounds are effectively smothered within the enclosing housing 11 and double door 64. The sound vibrations are not transmitted to the housing 11 because all of the moving parts are mounted on the support plate 22 and have clearance with respect to the housing 11. The interchangeable lens assembly 14 does not serve to broadcast sounds generated within the housing 11 because there is no contact between any of the moving parts with the housing 11.

The camera of this invention does not require enclosure within a "blimp". A 35 mm camera of the type disclosed was found to produce only about 27±1 decibels when operating with film in place.

Having fully described my invention, it is to be understood that I am not to be limited to the details herein set forth but that my invention is of the full scope of the appended claims.

I claim:

1. In a motion picture camera, the combination of: a housing, a camera movement assembly enclosed with said housing, a support member within said housing, means for mounting the camera movement assembly on said support member, sound-absorbing connector means securing said support member to said housing, said camera movement assembly being spaced from the enclosing housing and without any contact therewith, the camera housing having an upper portion provided with a first opening and having a rearward portion provided with a second opening, means for securing a film magazine selectively over either of said openings whereby a film strip in said magazine may pass through the selected opening to the camera movement assembly, a lens mount fixed on the housing and without contact with said support member, and a closure member for closing either of said openings releasably engaging said housing and closing one of said openings.

2. In a motion picture camera having a housing, the combination of: a camera movement assembly and a film strip feeding device both enclosed within said housing, an electric motor within the housing and connected to drive both the camera movement assembly and the film strip feeding device, the camera housing having an upper portion provided with a first opening and having a rearward portion provided with a second opening, means for selectively securing a film magazine in either one of said openings whereby a film strip in said magazine may pass through said one opening to the camera movement assembly and film strip feeding device and a closure member releasably engaging said housing and closing one of said openings.

3. In combination, a motion picture camera having a camera movement assembly and a film strip feeding device both enclosed within a housing, and a film magazine having a supply reel and a takeup reel mounted within an enclosing shell, the camera housing having an upper portion provided with a first opening and having a rearward portion provided with a second opening, means for selectively securing the film magazine shell in either one of said openings whereby a film strip may pass through said one of said openings from said supply reel through the camera movement assembly and film strip feeding device and back through the same opening to the takeup reel in the film magazine, and a closure member for closing either of said openings releasably engaging said housing and closing one of said openings.

* * * * *